United States Patent
Guggenbichler et al.

(10) Patent No.: US 12,258,051 B2
(45) Date of Patent: Mar. 25, 2025

(54) PIVOTING AND SLIDING DOOR DEVICE FOR ARRANGEMENT IN A DOOR OPENING OF A DOOR FRAME OF A VEHICLE

(71) Applicant: KNORR-BREMSE GESELLSCHAFT MIT BESCHRÄNKTER HAFTUNG, Mödling (AT)

(72) Inventors: Stefan Guggenbichler, Linz (AT); Daniel Weinbergmair, Behamberg (AT); Thomas Hirtenlehner, Wolfsbach (AT); Johann Wilflinger, Linz (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 155 days.

(21) Appl. No.: 17/285,837

(22) PCT Filed: Sep. 18, 2019

(86) PCT No.: PCT/EP2019/074973
§ 371 (c)(1),
(2) Date: Apr. 15, 2021

(87) PCT Pub. No.: WO2020/078650
PCT Pub. Date: Apr. 23, 2020

(65) Prior Publication Data
US 2021/0380147 A1    Dec. 9, 2021

(30) Foreign Application Priority Data
Oct. 15, 2018 (DE) .................... 10 2018 008 139.8

(51) Int. Cl.
*B61D 19/00* (2006.01)
*B60J 10/24* (2016.01)
(Continued)

(52) U.S. Cl.
CPC ............ *B61D 19/008* (2013.01); *B60J 10/24* (2016.02); *B60J 10/248* (2016.02); *B60J 10/86* (2016.02); *B61D 19/02* (2013.01)

(58) Field of Classification Search
CPC ...... B61D 19/008; B61D 19/02; B61D 19/00; B61D 19/03; B60J 10/248; B60J 10/86;
(Continued)

(56) References Cited

U.S. PATENT DOCUMENTS 3,226,780 A * 1/1966 Landis .................. E06B 7/2309
49/495.1
4,109,416 A    8/1978 Newson et al.
(Continued)

FOREIGN PATENT DOCUMENTS

| CN | 1776176 A | 5/2006 |
| CN | 206503509 U | 9/2017 |

(Continued)

OTHER PUBLICATIONS

International Search Report and Written Opinion corresponding to PCT/EP2019/074973, dated Jan. 8, 2020.

*Primary Examiner* — Zachary L Kuhfuss
*Assistant Examiner* — Heaven R Buffington
(74) *Attorney, Agent, or Firm* — Barnes & Thornburg LLP

(57) ABSTRACT

A pivoting and sliding door device for arrangement in a door opening of a door frame of a vehicle, in particular a rail vehicle, includes at least one pivoting and sliding door, which has a door leaf which is movable relative to the door frame and is mounted on the door frame between a door leaf closed position and a door leaf open position such that the movement direction of the door leaf runs substantially horizontally during an opening process and during a closing process.

20 Claims, 5 Drawing Sheets

(51) Int. Cl.
  *B60J 10/248* (2016.01)
  *B60J 10/86* (2016.01)
  *B61D 19/02* (2006.01)

(58) Field of Classification Search
  CPC ... B60J 10/24; B60J 10/00; B60J 10/20; B60J 10/246; B60J 10/277; E06B 7/2316; E06B 7/2309; E06B 7/2307; E06B 7/2305; E06B 7/23
  USPC .......................................................... 105/397
  See application file for complete search history.

(56) References Cited

U.S. PATENT DOCUMENTS

| | | |
|---|---|---|
| 2012/0260579 A1 | 10/2012 | DeMello |
| 2017/0044819 A1 | 2/2017 | Krueger |
| 2020/0009954 A1 | 1/2020 | Hirtenlehner et al. |

FOREIGN PATENT DOCUMENTS

| | | | |
|---|---|---|---|
| CN | 107407127 A | 11/2017 | |
| CN | 108099561 A | 6/2018 | |
| DE | 2511184 A1 | 10/1975 | |
| DE | 3710451 A1 | 10/1988 | |
| DE | 20311653 U1 | 11/2003 | |
| DE | 202008002914 U1 | 8/2009 | |
| DE | 202014104110 U1 | 10/2014 | |
| DE | 102014208288 A1 | 11/2015 | |
| DE | 102016112862 A1 | 1/2018 | |
| DE | 102017002018 A1 | 9/2018 | |
| EP | 900708 A1 * | 3/1999 | .............. B60J 10/40 |
| EP | 1504942 A1 * | 2/2005 | ............ B60J 10/244 |
| EP | 3269613 A1 | 1/2018 | |
| WO | 2018091123 A1 | 5/2018 | |

* cited by examiner

PIVOTING AND SLIDING DOOR DEVICE FOR ARRANGEMENT IN A DOOR OPENING OF A DOOR FRAME OF A VEHICLE

CROSS REFERENCE AND PRIORITY CLAIM

This patent application is a U.S. National Phase of International Patent Application No. PCT/EP2019/074973 filed Sep. 18, 2019, which claims priority to German Patent Application No. 10 2018 008 139.8, the disclosure of which being incorporated herein by reference in their entireties.

FIELD

Disclosed embodiments relate to a pivoting and sliding door device for arrangement in a door opening of a door frame of a vehicle, in particular a rail vehicle.

BACKGROUND

Vehicles for the mass transport of people frequently have pivoting and sliding doors or folding doors through which passengers may enter and alight from the vehicle. In such a pivoting and sliding door, the at least one door leaf is opened and closed by a combination of a first movement direction and a second movement direction, wherein the first movement direction is perpendicular to an outer face of the vehicle and the second movement direction is parallel to the outer face of the vehicle. As a result, the door opening may be released in a space-saving manner and people waiting on or in the vehicle are not hindered by the door leaf pivoting out. By the use of pivoting and sliding doors, therefore, it is achieved that passengers may enter and alight rapidly. A further requirement for such pivoting and sliding door devices is to seal the interior of the vehicle toward the outside by means of a door seal device.

SUMMARY

Disclosed embodiments relate to a pivoting and sliding door device for arrangement in a door opening of a door frame of a vehicle, in particular a rail vehicle.

Disclosed embodiments have a pivoting and sliding door device of the type mentioned in the introduction such that it achieves a high sealing action with a simple configuration of the door seal device. A rail vehicle with such a pivoting and sliding door device is also intended to be provided.

Disclosed embodiments have at least one pivoting and sliding door, which has a door leaf which is movable relative to the door frame and is mounted on the door frame between a door leaf closed position and a door leaf open position such that the movement direction of the door leaf runs substantially horizontally during an opening process and during a closing process, a door sill having a tread which is inclined to the horizontal, for persons entering and alighting, a door seal device having a passive lower door seal which seals a gap between a lower edge of the door leaf and the tread.

In accordance with at least one embodiment, the lower door seal is fastened to the lower edge or in the region of the lower edge of the door leaf and seals by a sealing section against the inclined tread when the door leaf is in the closed position.

In accordance with at least one embodiment, a rail vehicle has at least one such pivoting and sliding door device.

BRIEF DESCRIPTION OF THE FIGURES

The disclosed embodiments are described in more detail hereinafter with reference to examples, with reference to the accompanying drawings, in which.

DETAILED DESCRIPTION

Figure 1:
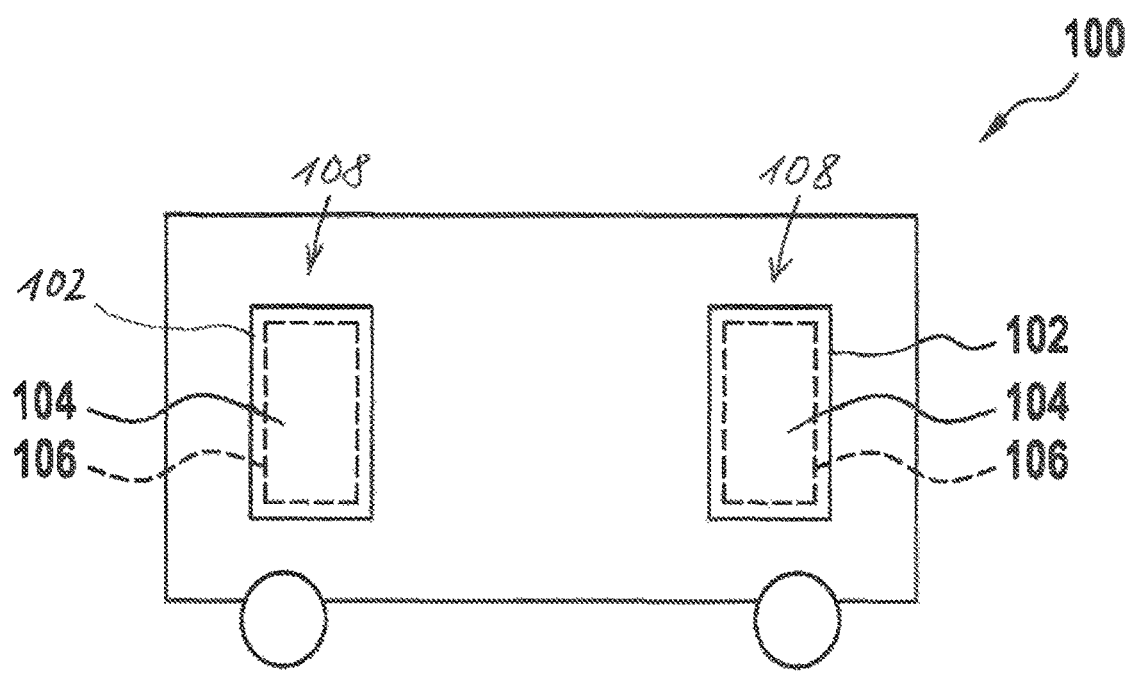
FIG. 1 shows a schematic view of a rail vehicle with an exemplary embodiment of a pivoting and sliding door device of the present invention with an optional embodiment of a lower door seal.

As explained above, by the use of pivoting and sliding doors, passengers may enter and alight rapidly. A further requirement for such pivoting and sliding door devices is to seal the interior of the vehicle toward the outside by means of a door seal device.

A generic pivoting and sliding door device and/or a generic rail vehicle are disclosed in EP 3 269 613 A1. In this case, the lower door seal is configured as an elastomer body which has two sealing lips and which is resiliently mounted on a support frame by a spring element. The support frame in turn is adjustable vertically relative to the lower edge of the door leaf by adjustable fastening means. A drawback with such a configuration is firstly the high degree of constructional effort and secondly the relatively low sealing action of the two sealing lips.

Disclosed embodiments accordingly to develop a pivoting and sliding door device of the type mentioned in the introduction such that it achieves a high sealing action with a simple configuration of the door seal device. A rail vehicle with such a pivoting and sliding door device is also intended to be provided.

Disclosed embodiments relate to a pivoting and sliding door device for arrangement in a door opening of a door frame of a vehicle, in particular a rail vehicle. Disclosed embodiments have at least one pivoting and sliding door, which has a door leaf which is movable relative to the door frame and is mounted on the door frame between a door leaf closed position and a door leaf open position such that the movement direction of the door leaf runs substantially horizontally during an opening process and during a closing process. Disclosed embodiments have a door sill having a tread which is inclined to the horizontal, for persons entering and alighting. Disclosed embodiments have a door seal device having a passive lower door seal which seals a gap between a lower edge of the door leaf and the tread, wherein the lower door seal is fastened to the lower edge or in the region of the lower edge of the door leaf and seals by a sealing section against the inclined tread when the door leaf is in the closed position.

As mentioned above, in the case of such a pivoting and sliding door the at least one door leaf is opened and closed by a combination of a first movement direction with a second movement direction, wherein the first movement direction is perpendicular to an outer surface of the vehicle and the second movement direction is parallel to the outer surface of the vehicle.

The entering and alighting may be stepless and barrier-free using the tread of the door sill which is inclined relative to the horizontal.

Accordingly, disclosed embodiments provide a sealing section has at least one tubular first cavity which runs parallel to the lower edge of the door leaf and has a first cross-section when the door leaf is in the open position and a second cross-section, which is deformed in comparison with the first cross-section, when the door leaf is in the closed position.

In this context, "deformed" means, on the one hand, that the shape of the cross-section of the cavity changes and, for example, becomes flatter by contact with the tread of the door sill. For example, during the closing process of the door leaf into the door leaf closed position, a compression and/or reduction is implemented when viewed perpendicular to the tread and an extension of the cross-section of the sealing section and/or at least one first cavity thereof is implemented when viewed parallel to the tread. On the other hand, due to a compression of the sealing section and/or the at least one first cavity thereof, the volume of the cross-section of the at least one first cavity may also change and, in particular, become smaller—but does not have to.

The at least one first cavity is optionally self-contained and may be evacuated, filled with air at atmospheric pressure or at a lower pressure relative to atmospheric pressure or with a further resilient medium, for example with a foam.

Viewed in cross-section, the at least one first cavity is surrounded by a peripheral wall of the sealing section which also consists of a resilient material, in particular of an elastomer.

As a result, the sealing section may be deformed with the best possible resilience if the door leaf of the pivoting and sliding door runs substantially horizontally during a closing process and the sealing section thereby comes into contact with the tread which is inclined relative to the horizontal. The at least one first cavity which is configured in the sealing section thus brings about an effective osculation of the sealing section relative to the tread which has a positive effect on the sealing action. Moreover, lower requirements are thus set for the tolerances to be maintained between the door leaf and the tread. Last but not least, the tread which is inclined relative to the horizontal and which is configured in the manner of a ramp also ensures a further improved osculation of the sealing section relative to the tread, since during the closing process, therefore, the sealing section runs up against the ramp-shaped tread counter to the inclination thereof.

In accordance with disclosed embodiments, for example, the sealing section has a plurality of tubular first cavities which run parallel to the lower edge of the door leaf and which are arranged, in particular, parallel to one another. In this case, for example, a central cavity may be provided, the central cavity being surrounded by further cavities when viewed in the peripheral direction.

Particularly, the movement of the door leaf during the closing process, the inclination of the tread relative to the horizontal, and the sealing section may be designed and adapted to one another such that, starting from the door leaf open position in which the first undeformed cross-section of the first cavity is present, at the end of a first section of the closing process of the door leaf the sealing section bears against the tread with a contact surface, and during a second section of the closing process subsequent to the first section, then the sealing section remains substantially adhered to the tread with its contact surface and the door leaf moves further in the direction of the door closed position and, when the door leaf closed position is finally reached by the door leaf at the end of the second section of the closing process, the first cavity adopts the second deformed cross-section. In addition to the effective osculation already mentioned above, this enables that the wear of the sealing section of the lower door seal, due to sliding movements relative to the tread, is significantly reduced and/or avoided.

According to a development, a positive connection is achieved when the sealing section has at least in the region of the contact surface an outwardly protruding first toothing which runs transversely to the movement of the door leaf and which during the course of the closing process is brought into engagement with a second toothing on the tread running transversely to the movement of the door leaf. During the course of the opening process of the door leaf, the first toothing is in turn brought out of engagement with the second toothing which is permitted by the resilient properties of the sealing section.

This results in an improved sealing action since by the positive connection the sealing section is prevented from "slipping off" the tread. By using the toothing, it is ensured that the sealing section rolls on the tread when the door is closed, even in unfavorable friction conditions (cleaning agent, contaminants, etc.).

According to a further measure the lower door seal has a web section, in particular made of solid material and in particular vertically adjoining the sealing section, the web section in turn in particular transitioning vertically into a retaining section which is, in particular, releasably fastened to the lower edge of the door leaf.

In this case, a support device may be arranged on the lower edge of the door leaf such that during the closing process at least the web section is supported in an opposing direction relative to the movement direction of the door leaf. Since the web section is supported on the support device during the closing process, this ensures that the web section is no longer able to be deformed due to the retraction movement of the door leaf but the sealing section with the first cavity is able to be deformed to a maximum extent in order to achieve a further improved osculation and sealing action.

In a particularly optional manner the sealing section, the web section and the retaining section of the lower door seal are configured integrally from an elastomer material and thus form, for example, an extrusion profile, in particular as a material which may be cut to length by the meter.

The retaining section is thus positively received, for example, in a groove-like recess on the lower edge of the door leaf, wherein the groove-like recess has an undercut cross-section in which the retaining section positively engages. This positive engagement of the retaining section in the groove-like recess may be achieved, for example, by the retaining section being pressed by resilient deformation into the groove-like recess and then due to its resilience widening again inside the groove-like recess in the assembled end position, wherein the undercut cross-section thus ensures the positive connection. A separate fastening device is thus not required. Rather, the resilient properties of the retaining section are utilized for the fastening.

According to a development, the retaining section has a second tubular cavity. This second cavity thus increases the resilience of the retaining section of the lower door seal and thus facilitates the above-described assembly. The second cavity runs, in particular, parallel to the lower edge of the door leaf.

The tread of the door sill may have a first angle α ranging from 10 degrees to 15 degrees, and further approximately 14 degrees, relative to the horizontal.

According to a development, a sliding step arrangement may be provided for bridging a gap between the door sill and a walkable region which is external relative to the vehicle, the sliding step arrangement comprising a sliding step which may be driven between a retracted sliding step initial position and an extended sliding step end position, wherein the sliding step is guided or mounted in a retractable and extendable manner below the door sill.

For example, such sliding step arrangements are used in vehicles for the transportation of people, in order to facilitate boarding and alighting and in order to avoid endangering people. In this case, the sliding step may be moved by a drive to and fro between the retracted sliding step initial position (resting position) and the extended sliding step end position (working position) and to this end, for example, guided on two rails of a guide device, which are arranged parallel to one another. Generally the guidance of the sliding step is implemented via rollers.

For example, in a rail vehicle the sliding step of the sliding step arrangement serves for bridging the gap between the rail vehicle and a platform when the rail vehicle stops in a station. Thus passengers are prevented from entering the relevant gap. In the case of buses the sliding step may also serve to cover the gap between the vehicle and a curbside. The sliding step may also serve to bridge a difference in level between a platform of the vehicle and the station platform or sidewalk in order to facilitate boarding and alighting with wheelchairs and strollers. Last but not least, such a sliding step arrangement may also be used in vehicles for transporting sick or disabled people, for example in order to form by the extended sliding step a pathway for a movable stretcher or a wheelchair between a vehicle platform and a road or walkway. The sliding step thus forms in the extended sliding step end position a walkable surface between the vehicle and station platform and serves as boarding aid for people when entering and/or leaving the vehicle.

For example, the sliding step may be moved by a sliding step drive device to and fro between the retracted sliding step initial position (resting position) and the extended sliding step end position (working position), which is fully extended, but may also be stopped and held at any intermediate position.

The sliding step may be displaceably guided, in particular, in a sliding step cassette or a sliding step frame, wherein the sliding step cassette or the sliding step frame is then arranged below the door sill in the position of use.

In combination with the sliding step arrangement a scraper device may be provided, the scraper device having at a free end of the tread a flap which is pivotable about a horizontal axis and which is configured and provided in order to be positioned for scraping dirt and forming a ramp on the sliding step in the sliding step initial position, in the sliding step end position and also in the sliding step intermediate positions between the sliding step initial position and the sliding step end position. The flap thus forms, in particular, an extension of the tread and/or the door sill. Moreover, the tread of the door sill transitions, for example, steplessly into an upper surface of the flap in the position of use, which is also associated with stepless and barrier-free boarding and alighting.

The flap may be configured, in particular, to seal a gap between a lower surface of the door sill in the position of use and an upper surface of the sliding step in the position of use.

In "the position of use, the upper and/or lower" refers to the orientation of the relevant surface or component relative to the vertical in the use state or in the assembled state of the pivoting and sliding door device.

Particularly, the flap may have a second angle β ranging from 20 degrees to 40 degrees relative to the upper surface of the sliding step.

An articulated connection may be provided between the flap and the free end of the door sill for the pivotable mounting of the flap relative to the door sill. This articulated connection may contain pretensioning mechanisms, the flap being pretensioned thereby against the upper surface of the sliding step in the position of use.

According to a particular optional measure, in the door leaf closed position the flap protrudes below the sealing section of the lower door seal and is not in contact with the sealing section. The situation that the extension movement of the sliding step would otherwise be hindered by the sealing section is thereby prevented.

According to a development, the lower door seal forms a lower section of a peripheral door seal of the door seal device, which is configured in a peripheral manner on the periphery of the door leaf.

Moreover, a single door leaf (single-leaf pivoting and sliding door device) or two door leaves (double-leaf pivoting and sliding door device) may be provided, wherein the two door leaves run toward one another for closing the door opening and run away from one another for releasing the door opening.

Last but not least, the lower door seal may be designed integrally with at least one lateral door seal which is also fastened to the door leaf, wherein the lower door seal transitions continuously into the at least one lateral door seal in a curved section.

Moreover, the lower door seal may be fastened to the lower edge or in the region of the lower edge of the door leaf by an adjusting device, such that a vertical position of the lower door seal is adjustable relative to the lower edge of the door leaf.

Alternatively, the lower door seal may be fastened to the lower edge or in the region of the lower edge of the door leaf, such that a vertical position of the lower door seal is fixed relative to the lower edge of the door leaf. The lower door seal is then not adjustable.

Disclosed embodiments further relate to a rail vehicle having at least one above-described pivoting and sliding door device. The optional use of the pivoting and sliding door device according to at least one disclosed embodiment, therefore, is in a rail vehicle, whereby a track-bound vehicle is to be understood, such as for example a locomotive, a multiple unit, a railcar, a tram, a subway vehicle, a rail car such as a passenger railway car and/or passenger train and/or freight car, in particular a high-speed rail vehicle. Alternatively, the pivoting and sliding door device according to the disclosed embodiments could naturally also be used in a road-bound vehicle, for example in a bus.

FIG. 1 shows a schematic view of a rail vehicle 100 according to an exemplary embodiment. By way of example, the rail vehicle 100 has two pivoting and sliding door devices 108 with one respective door frame 102 and one respective pivoting and sliding door leaf 104, in short the door leaf 104. Each of the door leaves 104 has a door seal device 106, which in FIG. 1 are indicated merely in dashed lines due to their positions on the outer edges of the door leaves 104. The door seal devices 106 are configured to seal a gap located between the door leaves 104 and the door frame 102 when the doors are closed. To this end, the door seal devices 106 are arranged between the door leaves 104 and the door frame 102 along an overlapping region which is present in the closed state of the doors. The door seal devices 106 may be arranged along one or more edges of the door leaves 104. In FIG. 1 the door seal devices 106 are arranged merely by way of example peripherally along the upper edges, the lower edges and the side edges of the door leaves 104. In this case, by way of example the pivoting and sliding door devices 108 are single-leaf pivoting and sliding door devices with in each case only one pivoting and sliding door leaf 104. Naturally double-leaf pivoting and sliding door devices 108 may also be provided, with in each case two door leaves opening and closing in opposing directions.

If the door seal devices 106 consisting of a plurality of individual sections are assembled, for example from rectilinear sections and corner sections, the door seal devices 106 may also be denoted as door sealing systems.

The pivoting and sliding door devices 108 have pivoting and sliding doors which in this case, for example, have one respective pivoting and sliding door leaf 104 which is movable relative to the assigned door frame 102, in short a door leaf 104, which is mounted on the door frame 102 between a door leaf closed position and a door leaf open position, such that the movement direction of the door leaf 104 runs substantially horizontally and/or in a horizontal plane during an opening process and during a closing process of the pivoting and sliding doors. A pivot axis of the door leaves 104 is also optionally vertical.

Figure 2:
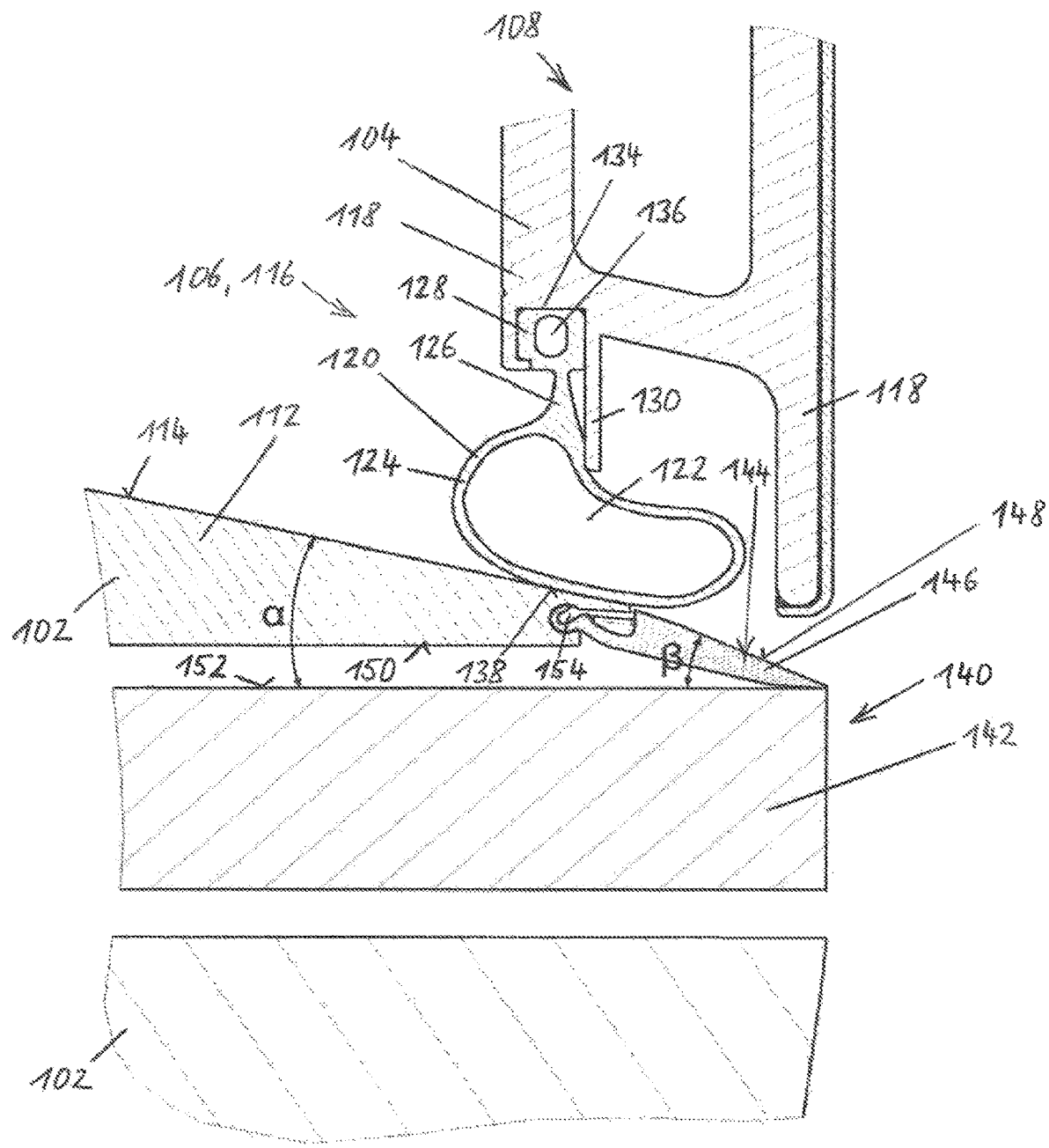
FIG. 2 shows a cross-sectional view of the pivoting and sliding door device of FIG. 1 with a door leaf and a sliding step in the respectively retracted position.

FIG. 2 shows a cross-sectional view of the pivoting and sliding door device 108 with a door seal device 106 according to an exemplary embodiment. The door seal device 106 is optionally designed in this case by way of example in the form of a peripheral sealing profile around a peripheral edge of the door leaf 104.

Also identifiable in FIG. 2 is a door sill 112 which represents a lower part of the door frame 102 with a tread 114, which is arranged so as to be inclined relative to the horizontal and/or horizontal plane, for people entering and alighting. The door seal device 106 in this case is a passive door seal device, i.e. it is already sealed by its initial configuration without, for example, aeration of the inner chambers having to be deployed for providing a seal in the door leaf closed position. Also identifiable in FIG. 2 is a lower door seal 116 of the door seal device 106 which seals a gap between a lower edge 118 of the door leaf 104 and the tread 114.

The lower door seal 116 is fastened to the lower edge 118 or in the region of the lower edge 118 of the door leaf 104 and in the door leaf closed position shown in FIG. 2 seals with a sealing section 120 against the inclined tread 114. The tread 114 of the door sill 112 optionally has a first angle α ranging from 10 degrees to 15 degrees, further optionally approximately 14 degrees, relative to the horizontal and/or relative to the horizontal plane.

The sealing section 120 has a tubular first cavity 122 which runs parallel to the lower edge 118 of the door leaf 104 and which in the door leaf open position has a first undeformed cross-section (FIG. 3) and in the door leaf closed position has a second cross-section which is deformed relative to the first cross-section, as FIG. 2 shows.

The first cavity 122 is surrounded by a wall 124 of the sealing section 120, in this case by way of example the wall is designed to be relatively thin. The first cavity 122 is optionally self-contained and may be evacuated, filled with air at atmospheric pressure or at a lower or higher pressure relative to atmospheric pressure or with a further resilient medium other than air, for example with a foam.

The first cavity 122 is also designed to be tubular and flexible relative to its longitudinal extent and when arranged between the door leaf 104 and the door frame 102 may be compressed with a closing movement of the door leaf 104 in order to seal a gap located between the door leaf 104 and the door frame 102 and/or tread 114. According to this exemplary embodiment, a longitudinal direction of extent of the sealing section 120 with the first cavity 122 is rectilinear so that the sealing section 120 with the first cavity 122 of the lower door seal 116 is arranged, for example, along the rectilinear lower edge 118 of the door leaf 104.

Optionally, at least the lower door seal 116 of the door seal device 106 has a web section 126, in particular vertically adjoining the sealing section 120 and in particular made of solid material, the web section in turn in particular transitioning vertically into a retaining section 128 which is in particular releasably fastened to the lower edge 118 of the door leaf 104. The web section 126 in this case is designed to be thinner relative to the retaining section 128 and the sealing section 120, the web section being arranged vertically therebetween. In a particular optional manner, the sealing section 120, the web section 126 and the retaining section 128 at least of the lower door seal 116 are configured integrally from an elastomer material and thus form, for example, an integral injection-molded part.

The retaining section 128 is thus positively received, for example, in a groove-like recess 134 on the lower edge 118 of the door leaf 104, wherein the groove-like recess 134 has an undercut cross-section into which the retaining section 128 positively engages. The positive engagement of the retaining section 128 in the groove-like recess 134 may be produced, for example, by the retaining section 128 being pressed by resilient deformation into the groove-like recess 134 and then in the assembled end position widening again inside the groove-like recess 134 due to its resilience, wherein the undercut cross-section thus ensures the positive connection.

The retaining section 128 has, for example, a second tubular cavity 136. This second cavity 136 thus increases the resilience of the retaining section 128 of the lower door seal 116 and thus facilitates the above-described assembly. The second cavity 136 runs, for example, in a rectilinear manner parallel to the lower edge 118 of the door leaf 104.

Figure 3:
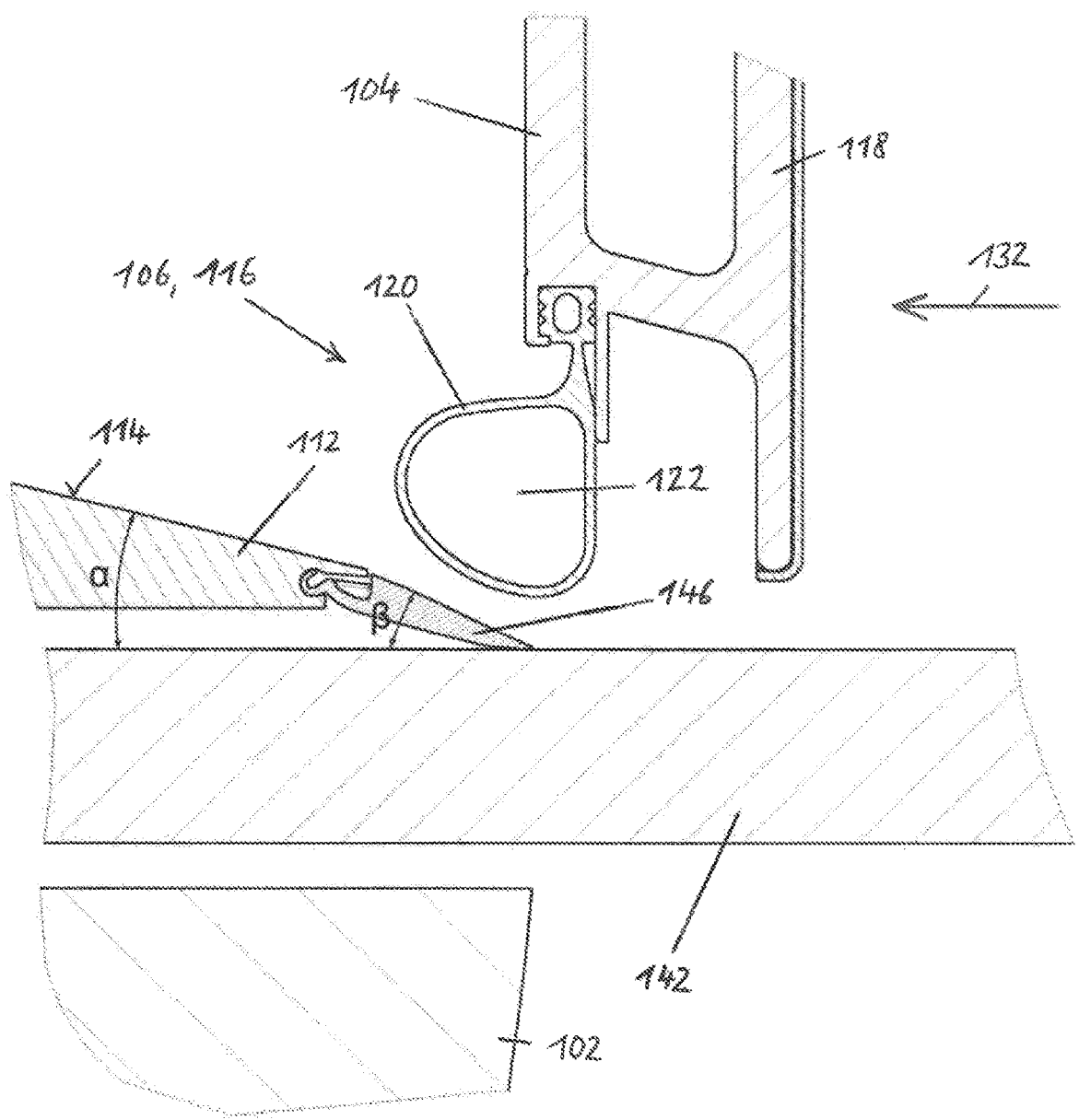
FIG. 3 shows a cross-sectional view of the pivoting and sliding door device of FIG. 1 with the door leaf and the sliding step in the extended position.

As is revealed by a comparison of the shape of the sealing section 120 in FIG. 2 with the shape of the sealing section 120 in FIG. 3, during the closing process in a position according to FIG. 3, in which the door leaf closed position is not yet reached and in which the sealing section 120 is not yet in contact with the tread 114, the first cavity 122 has an undeformed first cross-section. This first undeformed cross-section of the first cavity 122 is also present in the door leaf open position, as is easily conceivable.

Accordingly, in the door leaf closed position shown according to FIG. 2 the first cavity 122 has a second cross-section which is deformed relative to the first cross-section. The undeformed first cross-section is approximately circular whilst the second cross-section, which is deformed by the contact with the tread 114, is approximately elliptical. As a whole, when reaching the door leaf closed position, therefore, a compression is implemented when viewed perpendicular to the tread 114 and an extension of the cross-section of the sealing section 120 and/or the first cavity 122 thereof is implemented when viewed parallel to the tread 114. The deformation of the cross-section of the sealing section 120 and/or the first cavity 122 thereof brings about an effective osculation of the lower door seal 116 relative to the tread 114, which in turn results in an effective sealing action.

Particularly optionally, the movement of the door leaf 104 during the closing process into the door leaf closed position, the inclination (first angle α) of the tread 114 relative to the horizontal and the sealing section 120 and, in particular, the coefficient of friction of a contact surface 138 of the sealing section 120 with the tread 114 are designed and/or configured and/or adapted to one another such that, starting from the door leaf open position in which the first undeformed cross-section of the first cavity 122 is present, at the end of a first section of the closing process of the door leaf 104 the sealing section 120 bears against the tread 114 with its contact surface 138, whereby the cross-section of the first cavity 122 is already slightly deformed. During a second section of the closing process subsequent to the first section, the sealing section 120 remains substantially adhered to the tread 114 with its contact surface 138, wherein the door leaf 104, however, moves further in the direction of the door closed position which causes a further deformation of the cross-section of the first cavity 122. If the door leaf closed position (FIG. 2) is finally reached by the door leaf 104 at the end of the second section of the closing process, then the first cavity 122 adopts the second deformed cross-section.

By way of example, a support device 130, in this case for example in the form of a rib protruding downwardly from the lower edge 118, is arranged on the lower edge 118 of the door leaf 104 such that the web section 126 is supported in an opposing direction relative to the movement direction 132 of the door leaf 104, for example during the closing process of the door leaf 104, wherein the movement direction 132 of the door leaf 104 during the closing process is symbolized by an arrow in FIG. 3. The support of the web section 126 on the support device 130 thus ensures that the web section 126 is not able to be deformed due to the retracting movement of the door leaf 104 but the sealing section 120 with the first cavity 122 is then deformed to a maximum extent in order to achieve a further improved osculation and sealing action between the sealing section 120 and the tread 114.

For example, the pivoting and sliding door device 108 may be provided a sliding step arrangement 140 for bridging a gap between the door sill 112 and an external station platform relative to the rail vehicle 100, the sliding step arrangement comprising a sliding step 142 which is drivable in a linear manner between a retracted sliding step initial position and an extended sliding step end position, wherein the sliding step 142 is thus guided or mounted, for example, in a retractable and extendable manner below the door sill 112.

The sliding step 142 may be displaceably guided, in particular, in a sliding step cassette or a sliding step frame, not shown here, wherein the sliding step cassette or the sliding step frame is thus arranged below the door sill 112 in the position of use.

In this case, a scraper device 144 is provided in combination with the sliding step arrangement 140, the scraper device having a flap 146 which is pivotable about a horizontal axis at a free end of the tread 114 and which is configured and provided in order to be positioned for scraping dirt and forming a ramp on the sliding step 142 in the sliding step initial position, in the sliding step end position and in the sliding step intermediate positions between the sliding step initial position and the sliding step end position. The flap 146 thus forms, in particular, an extension of the tread 114 and/or the door sill 112. Moreover, the tread 114 of the door sill 112 transitions, for example, steplessly into an upper surface 148 of the flap 146 in the position of use.

The flap 146 may be configured, in particular, to seal a gap between a lower surface 150 of the door sill 112 in the position of use and an upper surface 152 of the sliding step 142 in the position of use.

Particularly optionally, the flap 146 has a second angle β ranging from 20 degrees to 40 degrees relative to the upper surface 152 of the sliding step 142.

An articulated connection 154 is provided between the flap 146 and the free end of the door sill 112, for example, for the pivotable mounting of the flap 146 relative to the door sill 112. This articulated connection 154 may contain pretensioning means, the flap 146 being pretensioned thereby against the upper surface 152 of the sliding step 142 in the position of use.

Particularly optionally, in the door leaf closed position the flap 146 protrudes below the sealing section 120 of the lower door seal 116 and is not in contact with the sealing section 120. It is thereby prevented that the extending movement of the sliding step 142 is hindered by the sealing section 120.

Figure 4:
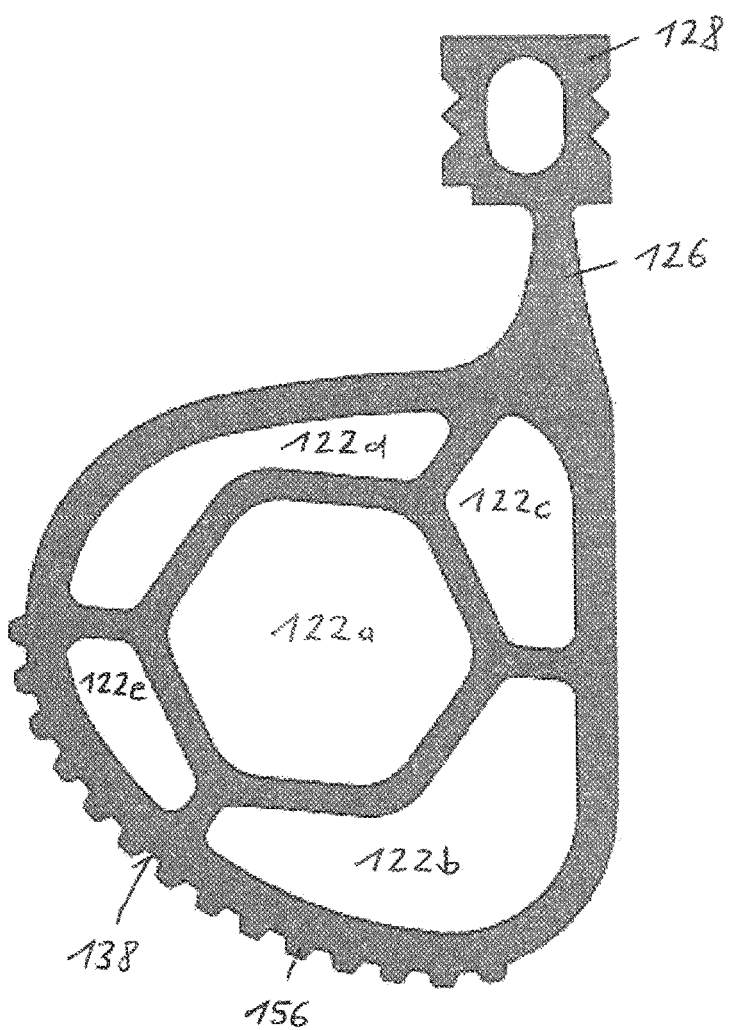
FIG. 4 shows a cross-sectional view of a lower door seal according to a further embodiment.

According to a further embodiment of a lower door seal 116, shown in FIG. 4, the sealing section 120 has a plurality of tubular first cavities 122a to 122e which run parallel to the lower edge 118 of the door leaf 104. These cavities 122a to 122e are arranged, in particular, parallel to one another. Optionally, in this case a central cavity 122a is provided, the central cavity being surrounded by further cavities 122b to 122e in the manner of satellites, when viewed in the peripheral direction.

Figure 5:
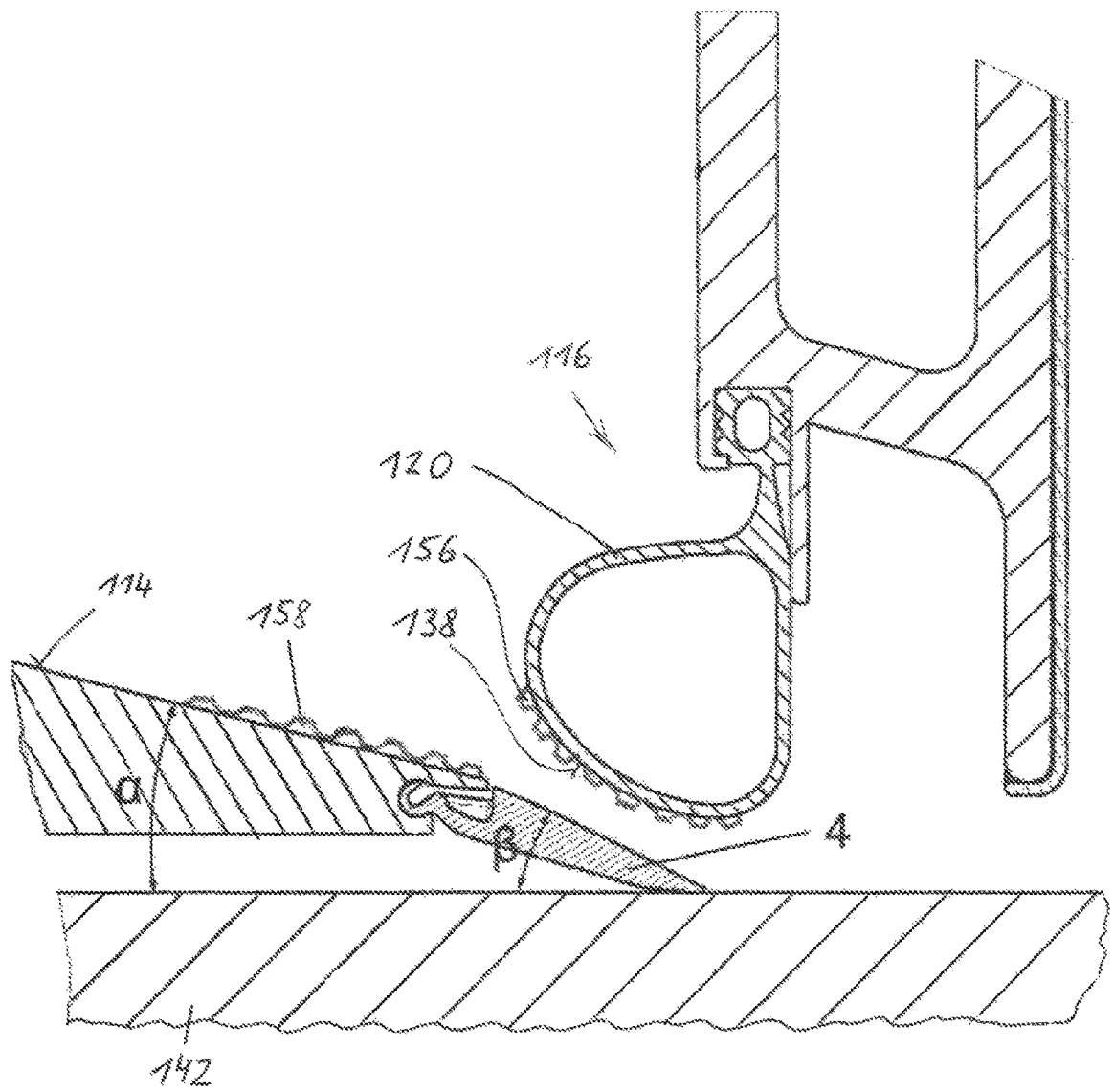
FIG. 5 shows a cross-sectional view of a pivoting and sliding door device according to a further embodiment with a lower door seal according to FIG. 4 and with the door leaf and the sliding step in the extended position.

FIG. 5 shows a cross-sectional view of a pivoting and sliding door device 108 according to a further embodiment with a lower door seal 116 according to FIG. 2 and FIG. 3, wherein the door leaf 104 and the sliding step 142 are in the extended position. In this case, the sealing section 120 has at least in the region of the contact surface 138 an outwardly protruding first toothing 156 which runs transversely to the movement of the door leaf 104 and which during the course of the closing process is brought into engagement with a second toothing 158 on the tread 114 running transversely to the movement of the door leaf 104. When opening the door leaf, therefore, the first toothing 156 is in turn brought out of engagement with the second toothing 158. The bringing into engagement and bringing out of engagement is permitted by the resilient properties of the sealing section 120.

As may be easily conceived, the lower door seal 116 may be integrally designed with, for example, two lateral door seals fastened to the door leaf 104, for example as material which may be cut by the meter, and continuously transition into these lateral door seals in, for example, curved sections.

The lower door seal 116 may also be fastened to the lower edge 118 or in the region of the lower edge 118 of the door leaf 104 by an adjusting device, not shown here, such that a vertical position of the lower door seal 166 is adjustable relative to the lower edge 118 of the door leaf 104.

Embodiments which contain any combination of the features described herein are also encompassed within the scope of the disclosed embodiments.

| List of reference numerals | |
| --- | --- |
| 100 | Rail vehicle |
| 102 | Door frame |
| 104 | Door leaf |
| 106 | Door seal device |

-continued

| List of reference numerals | |
|---|---|
| 108 | Pivoting and sliding door device |
| 112 | Door sill |
| 114 | Tread |
| 116 | Lower door seal |
| 118 | Lower edge |
| 120 | Sealing section |
| 122, 122a-122e | First cavities |
| 124 | Wall |
| 126 | Web section |
| 128 | Retaining section |
| 130 | Support device |
| 132 | Movement direction - closing process |
| 134 | Recess |
| 136 | Second cavity |
| 138 | Contact surface |
| 140 | Sliding step arrangement |
| 142 | Sliding step |
| 144 | Scraper device |
| 146 | Flap |
| 148 | Upper surface |
| 150 | Lower surface |
| 152 | Upper surface |
| 154 | Articulated connection |
| 156 | First toothing |
| 158 | Second toothing |

The invention claimed is:

1. A pivoting and sliding door device for arrangement in a door opening of a door frame of a rail vehicle, the device comprising:
at least one pivoting and sliding door, which has a door leaf which is movable relative to the door frame and is mounted on the door frame between a door leaf closed position and a door leaf open position such that the movement direction of the door leaf runs substantially horizontally during an opening process and during a closing process;
a door sill of the door frame having a tread which is inclined to the horizontal, for persons entering and alighting, and
a door seal device having a passive lower door seal which seals a gap between a lower edge of the door leaf and the tread,
wherein the lower door seal is fastened to the lower edge or in the region of the lower edge of the door leaf and seals by a sealing section against the inclined tread when the door leaf is in the closed position,
wherein the sealing section has at least one tubular first cavity which runs parallel to the lower edge of the door leaf and has a first undeformed cross-section when the door leaf is in the open position and a second cross-section, which is deformed in comparison with the first cross-section, when the door leaf is in the closed position,
wherein the movement of the door leaf during the closing process, the inclination of the tread relative to the horizontal, and the sealing section cooperate such that, starting from the door leaf open position in which the first undeformed cross-section of the at least one first cavity is present, at the end of a first section of the closing process of the door leaf the sealing section bears against the tread with a contact surface, and that during a second section of the closing process subsequent to the first section, then the sealing section remains substantially adhered to the tread with its contact surface and the door leaf moves further in the direction of the door closed position and, when the door leaf closed position is finally reached by the door leaf at the end of the second section of the closing process, the at least one first cavity adopts the second deformed cross-section.

2. The pivoting and sliding door device of claim 1, wherein the sealing section has at least in the region of the contact surface an outwardly protruding first toothing, which runs transversely to the movement of the door leaf and which during the course of the closing process is brought into engagement with a second toothing on the tread running transversely to the movement of the door leaf and during the course of the opening process is brought out of engagement.

3. The pivoting and sliding door device of claim 1, wherein the lower door seal has a web section made of solid material and adjoining the sealing section, the web section transitioning into a retaining section which is releasably fastened to the lower edge of the door leaf.

4. The pivoting and sliding door device of claim 3, wherein a support device is arranged on the lower edge of the door leaf such that during the closing process at least the web section is supported in an opposing direction relative to the movement direction of the door leaf.

5. The pivoting and sliding door device of claim 3, wherein the sealing section, the web section and the retaining section are configured integrally from an elastomer material.

6. The pivoting and sliding door device of claim 5, wherein the retaining section is positively received in a groove-like recess on the lower edge of the door leaf, wherein the groove-like recess has an undercut cross-section in which the retaining section positively engages.

7. The pivoting and sliding door device of claim 3, wherein the retaining section has at least one second tubular cavity.

8. The pivoting and sliding door device of claim 1, wherein the tread of the door sill has a first angle ranging from 10 degrees to 15 degrees relative to the horizontal.

9. The pivoting and sliding door device of claim 1, wherein it has a sliding step arrangement for bridging a gap between the door sill and a walkable region which is external relative to the vehicle, the sliding step arrangement comprising a sliding step which may be driven between a retracted sliding step initial position and an extended sliding step end position, wherein the sliding step is mounted in a retractable and extendable manner below the door sill.

10. The pivoting and sliding door device of claim 9, wherein it has a scraper device which has at a free end of the tread a flap which is pivotable about a horizontal axis and which is configured and provided in order to be positioned for scraping dirt and forming a ramp on the sliding step in the sliding step initial position, in the sliding step end position and also in the sliding step intermediate positions between the sliding step initial position and the sliding step end position.

11. The pivoting and sliding door device of claim 10, wherein the flap is configured to seal a gap between a lower surface of the door sill in the position of use and an upper surface of the sliding step in the position of use.

12. The pivoting and sliding door device of claim 11, wherein the flap has a second angle ranging from 20 degrees to 40 degrees relative to the upper surface of the sliding step.

13. The pivoting and sliding door device of claim 10, wherein an articulated connection is provided between the flap and the free end of the door sill.

14. The pivoting and sliding door device of claim 10, wherein in the door leaf closed position the flap protrudes below the sealing section of the lower door seal and is not in contact with the sealing section.

15. The pivoting and sliding door device of claim 1, wherein the lower door seal forms a lower section of a peripheral door seal of the door seal device which is arranged in a peripheral manner on the periphery of the door leaf.

16. The pivoting and sliding door device of claim 1, wherein a single door leaf or two door leaves are provided in the pivoting and sliding door, wherein the two door leaves run toward one another for closing the door opening and run away from one another for releasing the door opening.

17. The pivoting and sliding door device of claim 1, wherein the lower door seal is designed integrally with at least one lateral door seal and transitions continuously therein in a curved section.

18. The pivoting and sliding door device of claim 1 wherein the lower door seal is fastened to the lower edge or in the region of the lower edge of the door leaf by an adjusting device, such that a vertical position of the lower door seal is adjustable relative to the lower edge of the door leaf.

19. The pivoting and sliding door device of claim 1 wherein the lower door seal is fastened to the lower edge or in the region of the lower edge of the door leaf, such that a vertical position of the lower door seal is fixed relative to the lower edge of the door leaf.

20. A rail vehicle having at least one pivoting and sliding door device of claim 1.

* * * * *